March 22, 1960  S. G. HARRIS  2,929,502
APPARATUS FOR RECOVERING MEAT FROM BONY MATERIAL BY FLOTATION
Filed March 14, 1957  2 Sheets-Sheet 1

March 22, 1960

S. G. HARRIS 2,929,502

APPARATUS FOR RECOVERING MEAT FROM BONY MATERIAL BY FLOTATION

Filed March 14, 1957

INVENTOR
Sterling G. Harris
BY
Pennie Edmonds Morton Barrows Taylor
ATTORNEYS 2,929,502
APPARATUS FOR RECOVERING MEAT FROM BONY MATERIAL BY FLOTATION Sterling G. Harris, Beaufort, S.C., assignor to The Blue Channel Corp., Port Royal, S.C., a corporation of Maryland Application March 14, 1957, Serial No. 646,090

5 Claims. (Cl. 209—173)

This invention relates to the recovery of meat from bony material by flotation and, more particularly, the invention is concerned with a novel apparatus by which the recovery may be effected. The apparatus may be employed in the recovery of meat of various kinds and, since all its advantages are realized when it is employed for recovering crab meat from the shell or bony material, in which the meat is enclosed and which has been broken up by various means to release the meat therefrom, a form of the apparatus for such use will be illustrated and described in detail for purposes of explanation.

For many years, the meat of crabs was recovered for use as fresh iced meat, and for canning, freezing, etc., by cooking the crabs as delivered at the dock and then manually picking the meat from the crab carcasses and claws. Such manual picking operations are slow and tedious, so that the output of even a skilled picker is relatively small, but, when labor was plentiful and the wage rates low, it was economically possible to utilize hand picking in the production of crab meat for commercial purposes. Even then such hand picking methods involving bare hands, knives, and pans often create unsanitary conditions in the fresh crab meat product and hand picking has never satisfactorily separated the meat from the shell. More recently, labor shortages, high wage scales, and sanitary requirements have necessitated the use of machine picking or extracting of crab meat and, in my Patent 2,895,162, issued July 21, 1959, I have illustrated and described an apparatus, by which crab meat may be rapidly extracted from the shell material, in which the meat was enclosed. In the use of the apparatus, the shell is broken without being shattered into fine pieces and most of the meat is freed from the shell. As the meat and shell are of different specific gravities, the use of brine flotation for separation of the meat from the shell appears to be the obvious expedient and the brine also has beneficial anti-bacterial action in washing and cleansing the meat. However, I have found that ordinary flotation apparatus is not satisfactory for the purpose because the mixture of meat and shell to be separated always includes material, which is semi-buoyant in a brine of a salinity such as to float the meat, while permitting the clean shell without meat attached to sink. Such semi-buoyant material is made up of pieces of meat with bits of shell adhering thereto and thin translucent pieces of shell material, resembling membrane and referred to hereinafter as cartilage, and is more frequently encountered in the treatment of body meat than in the separation of the meat and shell of claws.

The present invention is, accordingly, directed to the provision of a novel apparatus for the separation and recovery by flotation of pieces of meat from a mixture of the meat and the bony material, with which the meat was associated. The new apparatus makes it possible to recover the meat substantially free from pieces of bony material and, when the apparatus is used for recovering crab meat by brine flotation from a mixture of meat and broken shell material, in which the meat was enclosed, the meat recovered is substantially free of pieces of shell or cartilaginous material, which tends to remain suspended in the brine, either because of its small size or because of having bits of meat adhering thereto. The apparatus of the invention is essentially a flotation tank having special features, by which the separation of buoyant crab meat from non-buoyant shell and semi-buoyant pieces of shell may be carried out rapidly, effectively, and with little or no manual labor.

For a better understanding of the invention, reference may be made to the accompanying drawings, in which Fig. 1 is a view in side elevation with parts broken away of a flotation apparatus embodying the invention;

Figure 1:
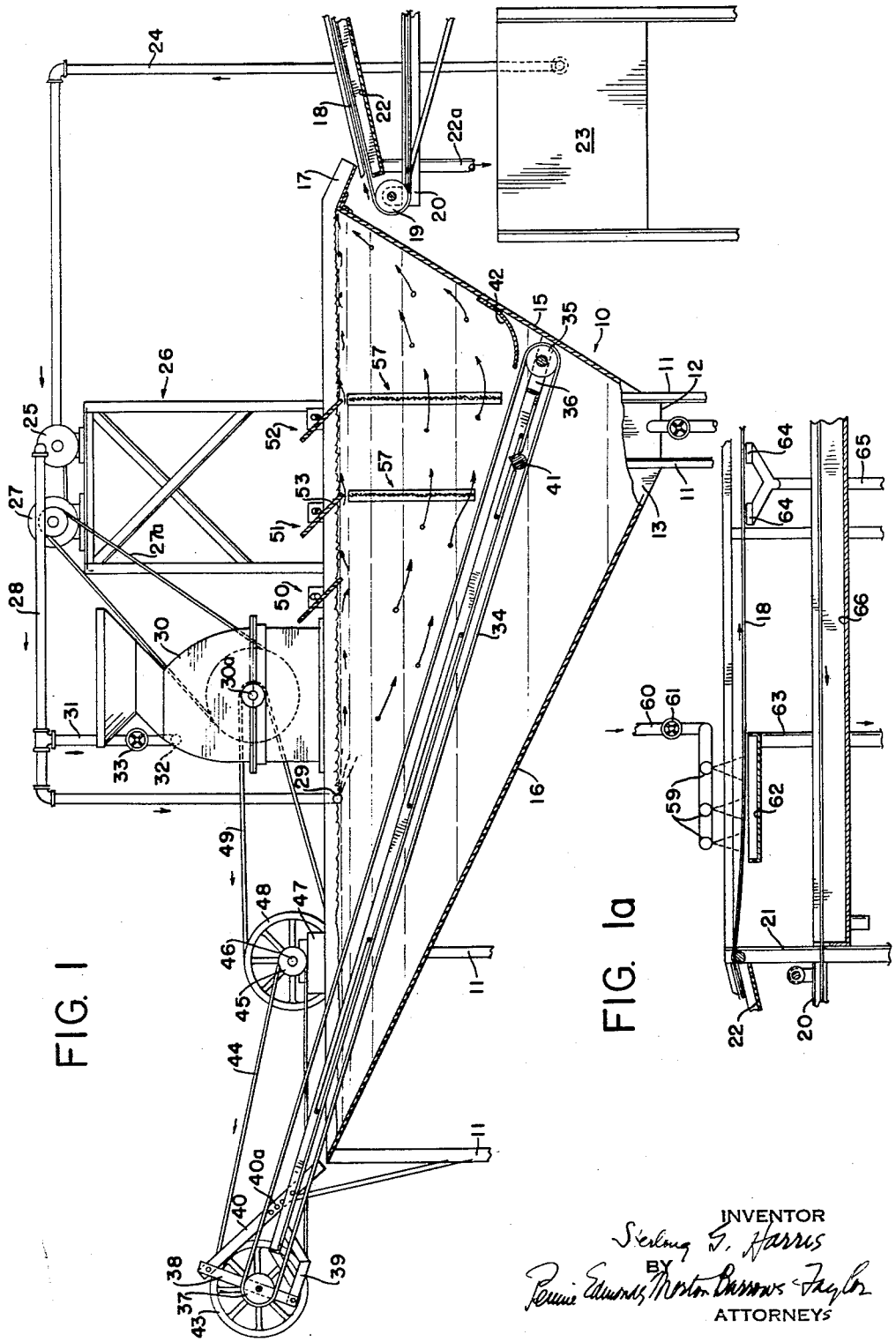
Fig. 1a is a fragmentary view similar to Fig. 1 showing additional features of the apparatus.
Figure 2:
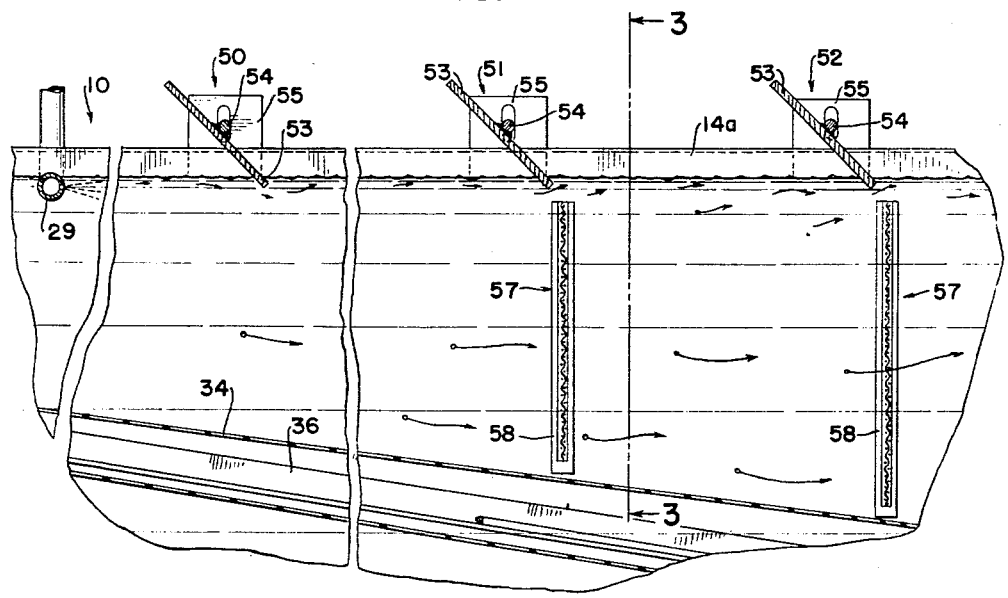
Fig. 2 is a fragmentary longitudinal sectional view on an enlarged scale of the tank of Fig. 1.
Figure 3:
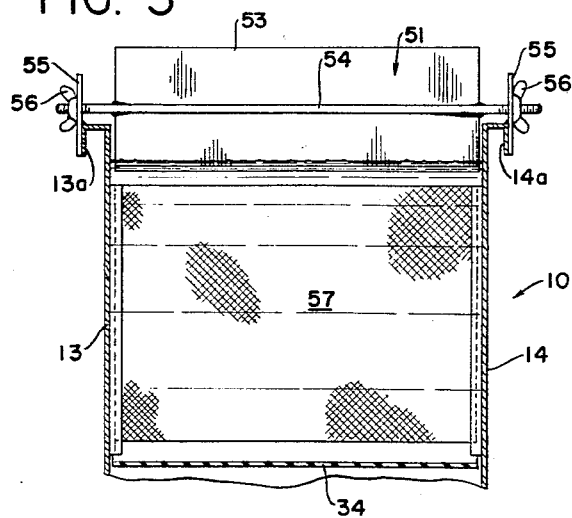
Fig. 3 is a sectional view on the line 3—3 of Fig. 2.

The apparatus illustrated in the drawings comprises a tank 10 supported on suitable legs 11 and made of a material, which is not subject to corrosion by the brine used and is easy to keep clean, stainless steel being preferred. The tank is relatively long and narrow and has a short flat bottom 12, side walls, 13, 14, and end walls 15, 16, which slope upwardly in opposite directions from the ends of the bottom. A tank, which has been found satisfactory in use, has a length at the top of about 9′ and an inside width of about 14″. The flat bottom 12 is about 6″ long and the end wall 15 leading up from one end of the bottom to the end of the tank, where the meat is discharged, is relatively steep and has a length of about 40″. The end wall 15 terminates a short distance below the tops of the side walls and a trough 17 leading downward and outward from the top of the end wall provides for overflow of brine and discharge of floating meat from the tank. The end wall 16 leads up from the other end of the bottom to the end of the tank, at which the shell material is discharged, and the wall 16 is less steep than the wall 15 and, in the tank illustrated, has a length of about 84″.

The tank 10 contains brine of a salinity such that the meat will float and the shell material will sink and the salinity is kept within a range on the salometer of 40° to 100°, based on a temperature of 60° F. or adjusted thereto. When the body meat of the crab is being recovered, a brine of a salinity of 50° at 60° F. has been found most satisfactory, while the most satisfactory brine for use in the recovery of claw meat has a salinity of 70°.

In the operation of the apparatus, the brine, which overflows from the tank through the trough 17, carrying floating pieces of meat with it, falls upon the upper stretch of an inspection and packing belt 18, which is trained about a drum 19 supported in bearings on arms 20 extending from vertical end members 21 of an inspection table. The belt 18 is preferably of stainless steel and is of perforated sheet metal or of woven wire construction, so that the brine falling on the belt will pass through it, while the meat is retained and carried away. The brine falling from the belt is caught in a receiving pan 22, which is located between the upper and lower sections of belt 18 and has a drainage pipe discharging the brine into a tank 23. Brine is withdrawn from tank 23 through a pipe 24 leading to the intake of a pump 25 mounted above the tank 10 on a framework 26 secured to structural members on the side walls 13, 14 of the tank. The pump is driven by a belt from a motor 27 mounted on framework 26 and a line 28 leads from the outlet of the pump to a discharge pipe 29 extending across the tank. Pipe 29 has orifices facing the brine overflow and slightly submerged below the surface of the brine or fixed at the surface of the brine, depending on the force of the movement of the brine surface desired. The orifices may vary in size and spacing and orifices of about ⅜" diameter and about 1" apart are satisfactory. The brine discharged under pressure through orifices creates currents in the brine bath and, by regulating the quantity of brine entering the tank, the currents will be as indicated by the arrows in Fig. 1. One of the currents, referred to as the "primary current," travels close to the surface of the bath to the brine overflow 17 of the tank. A secondary current, beginning at the orifices, travels downward at a low angle to the horizontal toward the end wall 15 and then upward along that wall to the brine overflow 17, the current losing force and velocity as its depth increases.

The mixture of meat and shell material to be separated in the apparatus is introduced into the primary or surface current and, in the apparatus illustrated, an extracting device 30 of the construction described in my Patent 2,895,162 and driven by motor 27 through belt 27a, is mounted on top of the side walls of the tank to extend across the latter and discharges into the tank on the orifice side of the pipe 29. A branch 31 from the brine line 28 leads to a perforated discharge pipe 32 within the extractor to supply brine to wash adhering pieces of meat and shell from the inner surfaces thereof and the relative rates of flow of brine from the pump to pipes 29 and 32 is controlled by a valve 33 in the branch.

The meat-shell mixture issuing from the extractor enters the primary surface or current in the brine bath and at once begins to separate. The pieces of meat are carried along in the primary current while the pieces of clean shell, that is, those which do not have meat attached thereto and are, therefore, non-buoyant, sink rapidly through the bath and fall upon the belt 34. The belt is trained about a drum 35 in bearings in the side bars 36 of a rectangular frame, which is sufficiently long to project out of the tank when the ends of the bars lie abutted against the tank wall 15. At its outer end, the belt is trained about a drum 37 mounted for rotation in arms 38, which are pivotally attached at one end to extensions 39 of the frame. Arms 40 pivotally connected to the other ends of arms 38 are provided with a series of openings 40a and can be held in different positions relative to the frame by removable pins, which pass through openings 40a in the arms and through openings in the side bars of the frame. The adjustment of arms 40 as described makes it possible to change the angular positions of arms 38 and thus maintain the belt 34 under tension. The frame is supported removably in the tank by means of short rods 41, which extend through openings in the sides 13, 14 of the tank and are received in notches in the lower edges of the side bars of the frame. When the belt is in operative position, the pulley 35 lies beneath a shield 42, which is attached to the wall 15 of the tank and prevents sinking material from passing between the belt and the tank wall. The shaft of drum 37 carries a large pulley 43, which is connected by a belt 44 to a small pulley 45 on a shaft 46 mounted in bearings in a support 47 attached to the top of side wall 14 of the tank. Shaft 46 also carries a large pulley 48 connected by a belt 49 to a small pulley on the main shaft 30a of the extracting device 30.

In order to insure the sinking through the brine bath of pieces of shell, particularly the fine cartilaginous material and the pieces made semi-buoyant by meat adhering thereto, the tank is provided with a plurality of spaced surface baffles, which project down a short distance into the surface or primary current in the brine bath and thus cause a downward deflection of the current at each baffle. As a result of this downward deflection of the surface or primary current carrying suspended meat free of shell, meat with bits of shell attached, and thin cartilaginous materials, a second separation of meat from shell occurs whereby the buoyant clean meat passes under the lower edges of the baffles with the primary current and rises to the surface again beyond the baffles. In the apparatus illustrated, there are three baffles 50, 51, 52, each of which comprises a plate 53 made preferably of stainless steel sheet and having a rod 54 secured to one face to extend along its axis. The rod is threaded at each end and extends through slots in a pair of vertical plates 55 secured to flanges 13a, 14a at the tops of the tank side walls 13, 14. A pair of wing nuts 56 on the ends of each rod are used to secure the rod and its plate 53 at the desired height in the slots in plates 55 and with plate 53 at the desired inclination to the vertical. Ordinarily, the baffles are placed with their lower edges from ½" to 1" below the surface of the brine and with the plane of the plates of the baffles making an angle of about 45° to the horizontal.

In deflecting the surface or primary current of the brine downwardly, the surface baffles 50, 51, 52 cause a thorough wetting of the semi-buoyant particles of meat with bits of shell attached and pieces of cartilage, so that the particles and pieces are freed from air bubbles and surface tension effects are eliminated. In addition, the particles of meat and the pieces of cartilage are saturated with brine so that their specific gravity changes and their tendency to sink increases. The particles and pieces are, accordingly, thrown down out of the surface or primary current and enter the weaker secondary current, through which some of the material, which has become non-buoyant, passes to belt 34, while the remainder of the material, which is semi-buoyant in various degrees, is carried along with the secondary current.

In order to insure that the semi-buoyant material will fall through the secondary current, it may be desirable to make use of a plurality of vertical porous baffles 57, which may be advantageously made of screen material, such as a wire cloth made of stainless steel wire and having two or three meshes to the inch. The baffles include a frame enclosing the screen cloth and they are mounted in channels 58 attached to the inner faces of the side walls of the tank. The baffles are disposed with their upper edges lying from 1" to 1½" below the brine surface and below and just beyond the lower edges of respective surface baffles. The lower edges of the baffles 57 preferably lie from 1" to 1½" above the surface of the conveyor belt 34, by which the shell scrap is removed.

When the semi-buoyant material carried along in the secondary current reaches the porous baffles 57, the material is loosely held against the faces of the baffles while the current of brine passes freely through the baffles. As the material is restrained by the baffles, it becomes increasingly saturated with brine, so that it has an increased tendency to sink, and it continues to move downwardly through the secondary current, which grows weaker as its depth increases. When the material reaches the lower ends of the vertical baffles, a third separation occurs, with material, which has become non-buoyant by reason of absorption of brine sinking to the belt, while the remaining material, which is still semi-buoyant, passes beneath the ends of the baffles. The semi-buoyant material continues forward in the secondary current, which is deflected upwardly along the end wall 15 of the tank. The material passes out through the overflow 17 and is deposited upon belt 18 together with the clean meat, which has been carried to the overflow in the primary current.

The belt 18, on which the meat carried out of the tank with the overlying brine drained therefrom, is trained about a drum, which is similar to the drum 19 and is mounted at the opposite end of the inspection table. One of the drums is driven and the belt is advanced at a sufficiently slow speed to permit inspection of the pieces of meat thereon. As the meat is carried along the belt, it is washed to remove the brine and then excess water is removed therefrom. For these purposes, a plurality of spray pipes 59 are mounted to extend across the upper stretch of belt 18 beyond the tank 22 and the pipes discharge fresh water supplied to them by a pipe 60 containing a valve 61. A pan 62 with a drain pipe 63 is mounted below the pipes 59 on the under side of belt 18 to collect the wash water and lead it away. Beyond the pipes 59, the belt passes above a pair of transverse pipes 64 connected by a pipe 65 to a suitable suction device, so that excess moisture on the meat on the belt may be removed and a final inspection of the pieces of meat facilitated. The inspection table is provided with a lengthwise drain pan 66 extending below the lower stretch of belt 18 from end to end of the table.

In the separation of meat from the shell material of crab claws, the use of the partially submerged or surface baffles causing downward deflection of the surface current in the brine bath has been found to give satisfactory results because the shell material of the claws is relatively dense and tends to sink rapidly through the brine. In the treatment of a meat-shell mixture derived from the bodies of crabs, the depression of the thin cartilaginous material and of the thin shell material forming the walls of the chambers or cells within the body is difficult and, to attain the desired results, it may be necessary to make use of the wholly submerged baffles 57.

In the use of the apparatus described, the separation of the meat from the shell and the recovery of the meat is accomplished by developing two currents in the brine of the tank, a primary and a secondary current, and, by the use of the surface and vertical baffles, three stages of separation of the meat from the shell are carried out. The first separation stage takes place directly under the extractor, where the pieces in the mixture of meat and broken shell material drop into the surface or primary current of the brine tank and quickly separate as they are carried along by this current and where the clean shell without meat attached sinks quickly on to belt 34. The second stage of separation is produced when the material carried along by the surface current passes down and around the lower edges of the surface baffles and the pieces of free meat, meat with bits of shell attached, and pieces of cartilage are subjected to centrifugal action. Beyond each baffle, the buoyant free meat quickly resurfaces, but the other material, from which air bubbles have been removed and which has become thoroughly wet with the brine as a result of immersion, continues downwardly into the secondary current to be carried forward therewith to the faces of the submerged porous baffles. The material is intercepted by the submerged baffles and, as the material becomes less buoyant because of greater saturation with the brine, the material moves downwardly along the faces of the baffles to the lower ends thereof where the third stage of separation takes place. In this stage, the material, which has become non-buoyant by brine absorption, falls to the belt 34, and the material, which is still semi-buoyant and consists of meat with small pieces of shell attached, is carried forward and then upward with the secondary current to the brine overflow 17.

The semi-buoyant material and the free meat carried to the overflow by the primary current pass out of the tank together and are deposited upon the inspection and packing belt 18. On this belt, the meat is drained of brine, washed with fresh water sprays to remove the salt, and partially dried of remaining moisture by suction, so that final inspection with recovered meat is facilitated whereby particles of bone, skin and undesirable elements are eliminated. The meat is then removed from the belt and packed directly into cans to be hermetically sealed or frozen or packed in ice and shipped as fresh crab meat. If the meat is to be marketed in the frozen or fresh condition, the belt 18 is preferably extended and the meat thereon is subjected to sufficient heat for pasteurization, following which the meat is quickly cooled by forced cold air. The product produced by the use of the apparatus meets all sanitary requirements for human consumption.

I claim:

1. An apparatus for separating pieces of meat from disintegrated bony material, with which the meat was associated, which comprises a tank having a bottom and end walls, at least one of which is inclined upwardly and outwardly from the bottom, the tank containing a bath of brine, in which the meat floats and bony material free of meat sinks, means for introducing the meat and bony material into the bath at its top between its ends, an overflow for brine and pieces of meat afloat therein at the top of the inclined end wall, means for draining the discharged brine from the pieces of meat, means for returning the brine to the bath at the side of the introducing means remote from the overflow, means for injecting the returned brine into the bath in jets lying close to the surface of the bath and directed toward the overflow, a plurality of imperforate baffles spaced along and extending across the tank, the baffles lying at an angle to the vertical and having their lower edges submerged in the bath, at least one porous baffle mounted to extend across the tank substantially vertically below the surface of the bath and with its upper edge adjacent the lower edge of an imperforate baffle, and means for removing sunken bony material from the tank.

2. The apparatus of claim 1, in which the tank has an end wall sloping upwardly to the overflow and the means for removing sunken bony material includes a belt having one end lying below the surface of the bath in the tank close to the upwardly sloping end wall, and the other end of the belt lying out of the bath and beyond the end of the tank remote from the overflow to discharge the shell material out of the tank.

3. The apparatus of claim 1, in which the porous baffle is made of screen material.

4. The apparatus of claim 2, in which the lower edge of the porous baffle lies close to the upper surface of the belt.

5. The apparatus of claim 1, in which there are three surface baffles and porous baffles are mounted below the second and third surface baffles in the direction of travel of the current toward the overflow.

References Cited in the file of this patent

UNITED STATES PATENTS

| | | |
|---|---|---|
| 640,319 | Perkins | Jan. 2, 1900 |
| 1,209,900 | Stebler | Dec. 26, 1916 |
| 1,757,103 | Voight | May 6, 1930 |
| 1,806,965 | Clement | July 12, 1932 |
| 2,051,676 | Bloedorn | Aug. 18, 1936 |
| 2,237,442 | Macfarlane | Apr. 8, 1941 |
| 2,530,676 | Berg | Nov. 21, 1950 |
| 2,545,517 | Harris et al. | Mar. 20, 1951 |
| 2,606,660 | Klepetco et al. | Aug. 12, 1952 |
| 2,608,716 | Harris | Sept. 2, 1952 |
| 2,633,987 | Bean | Apr. 7, 1953 |
| 2,711,822 | Novak | June 28, 1955 |